UNITED STATES PATENT OFFICE.

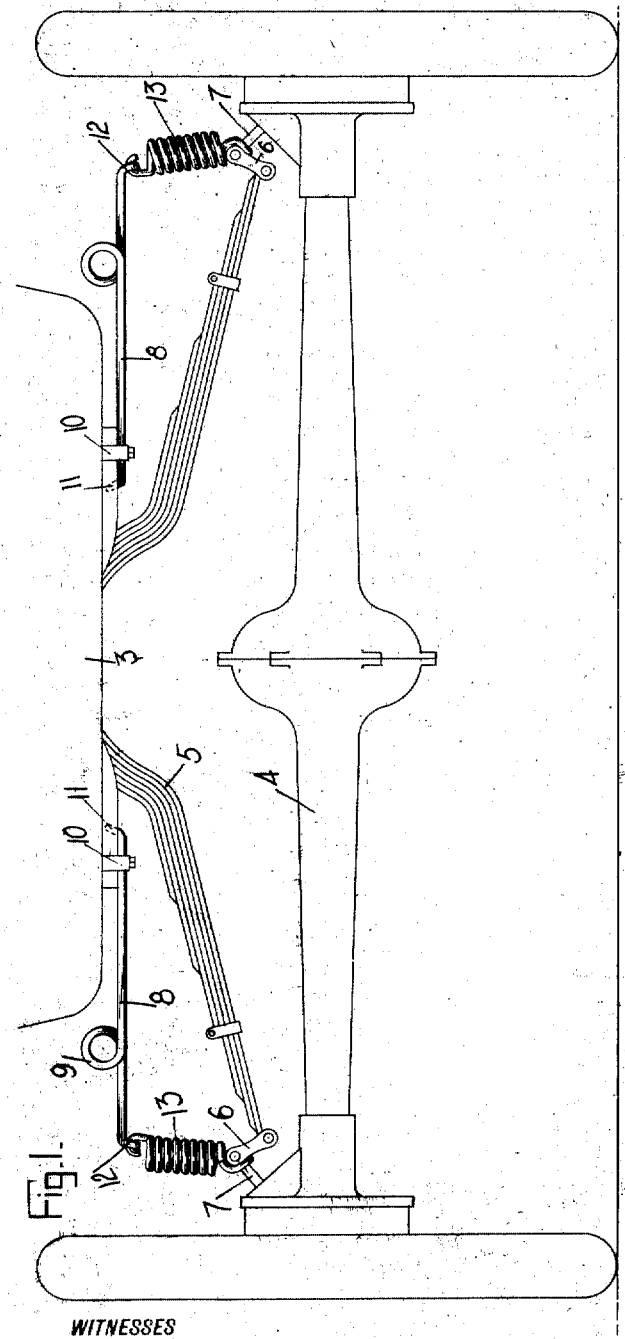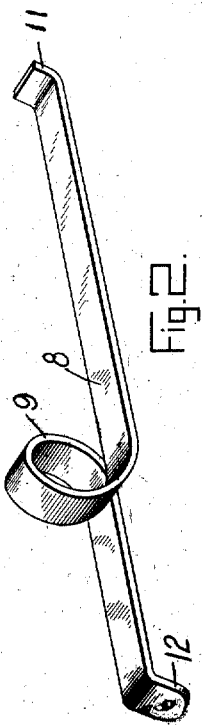

SETH A. BURROWS, OF NEW YORK, N. Y., ASSIGNOR TO WILLIAM OVERTON, OF NEW YORK, N. Y.

SHOCK-ABSORBER FOR VEHICLES.

1,281,248.      Specification of Letters Patent.      Patented Oct. 8, 1918.

Application filed December 29, 1915, Serial No. 69,195. Renewed March 6, 1918. Serial No. 220,873.

*To all whom it may concern:*

Be it known that I, SETH A. BURROWS, a citizen of the United States, and a resident of the city of New York, Little Neck, borough of Queens, in the county of Queens and State of New York, have invented a new and Improved Shock-Absorber for Vehicles, of which the following is a full, clear, and exact description.

My invention relates to shock absorbers of the flexible type adapted to coöperate with the spring suspension of a vehicle so as to render riding in auto-vehicles more comfortable. The object of the invention is to provide simple and inexpensive shock absorbers which can be easily attached to the spring suspension of an automobile and which will prevent the side sway of the vehicle body with relation to its spring, at the same time serving as a shock to undue reaction of the vehicle suspension.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in both views.

Figure 1 is a rear elevation of a Ford car suspension provided with an embodiment of my invention; and Fig. 2 is a perspective view of the resilient bar or lever.

Referring to the drawings, 3 is the vehicle frame suspended from a running gear 4 by a leaf spring 5 the central part of which is attached to the body. The ends of the spring are secured by a link 6 to studs 7 forming part of the running gear.

Extending from each side of the frame is a steel bar 8 having a loop 9 in the frame thereof, rendering that part of the bar more flexible. Each bar is secured with one end thereof to the frame through the medium of a bracket 10. Notches are provided in the frame of the vehicle to receive the corresponding up-turned ends 11 of the bars to prevent any sliding movement of the bars within the brackets. The two bars aline and are substantially in a plane with the running gear 4. The free end 12 of each bar is turned downwardly and apertured to receive one end of a tension spring 13. The other end of each spring is secured to the corresponding stud 7. The lower coil of the tension spring sits on the link to prevent the spring from sliding on the stud.

The tension springs 13 prevent any side sway of the vehicle. When a shock is transmitted through the leaf spring 5 to the body, the force of restitution which tries to throw the body 3 has to overcome not only the increasing tension of the springs 13 but also the resistance of the loops 9, whereby the shocks received by the running gear 4 are greatly reduced by means of my device. It will be seen from the drawings that my shock absorber can be easily attached to a vehicle. It is simple in construction and requires little up-keep for there are no complicated parts.

I claim:

1. In combination with a vehicle frame, running gear, and leaf spring having the ends thereof in pivotal engagement with the running gear and bearing on the frame between its ends, a flexible bar extending to each side of said vehicle frame above and along the leaf spring, and a tension spring connecting the bar to the running gear.

2. In combination with a vehicle frame, running gear, and leaf spring having the ends thereof in pivotal engagement with the running gear and bearing on the frame between its ends, a flexible bar extending to each side of said vehicle above and along the leaf spring, said bar having a loop formed in the body thereof, and a tension spring connecting the bar to the running gear.

3. In combination with a vehicle frame, running gear, and a leaf spring having the ends thereof in pivotal engagement with the running gear and bearing on the frame between its ends, a pair of flexible bars each having one end thereof secured to the frame, the other end of each bar extending away from the frame, each of said bars having a loop in the body thereof to render said bars more flexible at the loop, and a tension spring connecting said other end of each bar to the running gear adjacent the pivotal connection of said leaf spring.

4. In combination with a vehicle frame, running gear, and a leaf spring having the ends thereof in pivotal engagement with the running gear and bearing on the frame between its ends, a pair of flexible bars each having a loop between its ends rendering each bar more flexible where the loop is formed, means for securing one end of each bar to the frame, the other end of each bar being directed away from the frame, the two bars being in alinement and substantially in a plane with the running gear, and a tension spring connecting the said other end of each bar to the running gear adjacent the pivotal connection of the running gear with the leaf spring.

5. A shock absorber comprising a flexible bar having a loop between the ends thereof and oppositely-turned extremities, one end of the bar being adapted to be secured to a vehicle frame, one of the turned extremities adapted to prevent longitudinal displacement of the bar, and a tension spring connected to the other turned extremity of the bar and adapted to be secured to the running gear of a vehicle.

In testimony whereof I have signed my name to this specification in the presence of two subscribing witnesses.

SETH A. BURROWS.

Witnesses:
B. JOFFE,
G. H. EMSLIE.